United States Patent
Rafiee

(10) Patent No.: US 8,694,803 B1
(45) Date of Patent: Apr. 8, 2014

(54) CONTROLLING POWER RECEIVED THROUGH MULTIPLE BUS INTERFACES IN A PORTABLE COMPUTING DEVICE

(75) Inventor: Mansour Rafiee, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 421 days.

(21) Appl. No.: 12/950,490

(22) Filed: Nov. 19, 2010

Related U.S. Application Data

(60) Provisional application No. 61/292,660, filed on Jan. 6, 2010.

(51) Int. Cl.
*G06F 1/26* (2006.01)
*G06F 1/28* (2006.01)
*G06F 11/30* (2006.01)
*H02J 7/00* (2006.01)

(52) U.S. Cl.
USPC ........... 713/300; 713/330; 713/340; 455/572; 455/573; 455/574; 455/127.1; 455/127.5; 320/127; 320/128; 320/138

(58) Field of Classification Search
None
See application file for complete search history.

(56) References Cited

U.S. PATENT DOCUMENTS

| | | | |
|---|---|---|---|
| 2005/0245138 A1* | 11/2005 | Fischer et al. | 439/638 |
| 2009/0079264 A1* | 3/2009 | Minami | 307/44 |
| 2011/0167290 A1* | 7/2011 | Yoshimoto et al. | 713/340 |

* cited by examiner

*Primary Examiner* — Tanh Nguyen
(74) *Attorney, Agent, or Firm* — McDermott Will & Emery LLP

(57) ABSTRACT

The disclosed embodiments provide a system that enables a portable computing device to receive power through multiple bus interfaces at the same time. When the system senses that a first power source is plugged into a first bus interface in the portable computing device, the system determines whether the first power source is a host or a power adapter. Next, based upon whether the first power source is a host or a power adapter, the system uses a first power manager coupled to the first bus interface to limit a first input current received from the first power source to power the computing device. The system also provides the maximum charging current to a rechargeable battery for the portable computing device by chaining together a second bus interface whether power is present on the second bus interface or not.

21 Claims, 5 Drawing Sheets

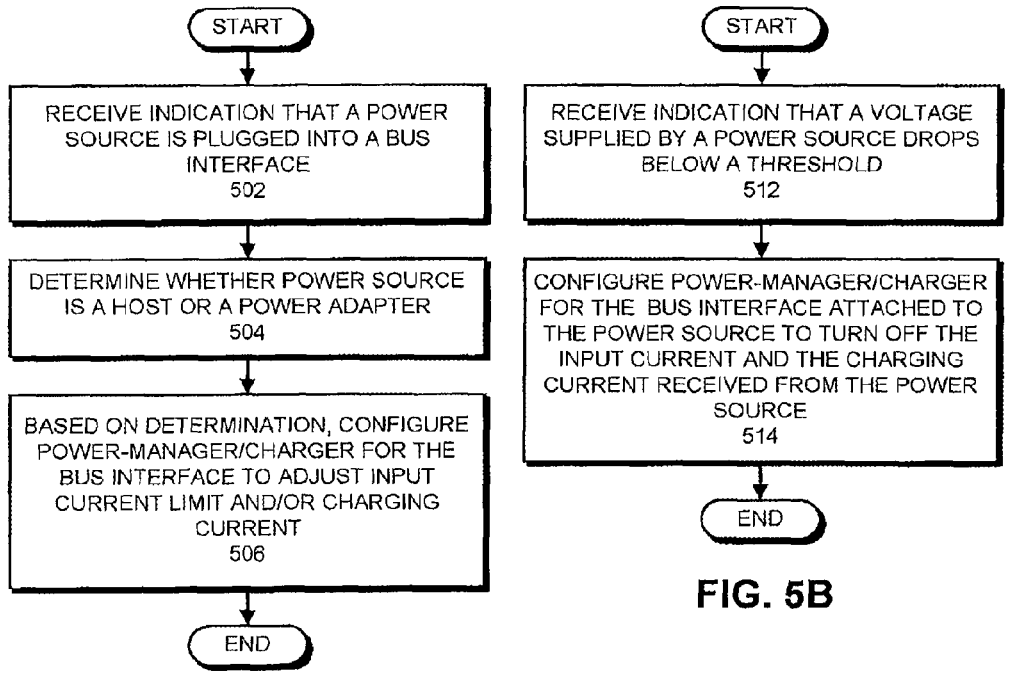
FIG. 5A
FIG. 5B
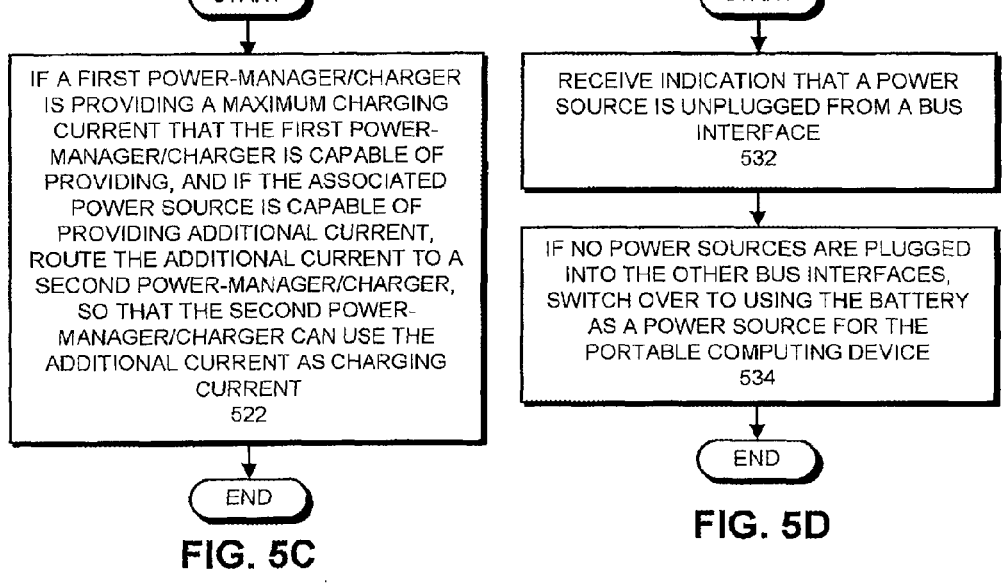
FIG. 5C
FIG. 5D

CONTROLLING POWER RECEIVED THROUGH MULTIPLE BUS INTERFACES IN A PORTABLE COMPUTING DEVICE

RELATED APPLICATION

This application hereby claims priority under 35 U.S.C. §119 to U.S. Provisional Patent Application No. 61/292,660 filed Jan. 6, 2010, entitled "Controlling Power Received Through Multiple Bus Interfaces in a Portable Computing Device," by inventors Mark Yoshimoto, Alex Crumlin and Mansour Rafiee. This application is also related to a pending U.S. patent application Ser. No. 12/901,969, entitled "Controlling Power Received through Multiple Bus Interfaces in a Portable Computing Device," by inventors Mark Yoshimoto and Alex Crumlin, filed on Oct. 11, 2010.

BACKGROUND

1. Field

The disclosed embodiments relate to techniques for providing power to computer systems. More specifically, the disclosed embodiments relate to a technique for controlling power received through multiple bus interfaces in a portable computing device.

2. Related Art

Recent improvements in computing power and wireless networking technology have significantly increased the capabilities of portable computing devices, such as laptops, tablet PCs, digital media players and smart phones. These portable computing devices typically include a number of bus interfaces, such as universal serial bus (USB) interfaces, which can be used to connect the portable computing device to various devices, such as non-volatile storage devices, I/O devices, networks, power adapters and even other computer systems. In fact, many portable computing devices can receive power through these bus interfaces, and this power can be used to operate the portable computing device and to charge a battery for the portable computing device. Unfortunately, the power which is received through a single bus interface is typically limited, either by the power source which is plugged into the bus interface, or by circuitry within the portable computing device that manages the power received through the bus interface.

Hence, what is needed is a method and an apparatus for receiving power through a bus interface of a portable computing device without the limitations of existing techniques.

SUMMARY

The disclosed embodiments provide a system that enables a portable computing device to receive power through multiple bus interfaces at the same time. When the system senses that a first power source is plugged into a first bus interface in the portable computing device, the system determines whether the first power source is a host or a power adapter. Next, based upon whether the first power source is a host or a power adapter, the system uses a first power manager coupled to the first bus interface to limit the first input current from the first power source to power the computing device, and also to selectively provide a first charging current to a rechargeable battery for the portable computing device.

Next, when the system senses that a second power source is plugged into a second bus interface in the portable computing device, the system determines whether the second power source is a host or a power adapter. Then, based upon whether the second power source is a host or a power adapter, the system uses a second power manager coupled to the second bus interface to limit the second input current from the second power source to power the computing device, and to selectively provide a second charging current to the rechargeable battery.

In some embodiments, if the voltage supplied by the first power source falls below a minimum threshold voltage, the system reduces the first input current received from the first power source.

In some embodiments, if the portable computing device is powered off, then when the first power source is plugged into the first bus interface, the first power manager supplies an initialization current to power up the portable computing device before a system controller in the portable computing device can determine whether the first power source is a host or a power adapter.

In some embodiments, if the first power manager is providing the maximum charging current that the first power manager is capable of providing to the rechargeable battery, and if the first power source is capable of providing additional current, the system routes the additional current to a second power manager associated with a second bus interface. This enables the second power manager to use the additional current as charging current to charge the rechargeable battery.

In some embodiments, if the first power source is a host, the system uses the first bus interface to facilitate communications between the first power source and the portable computing device, wherein the communications can take place while the first power source is supplying power to the portable computing device.

In some embodiments, upon sensing that the first power source becomes unplugged from the first bus interface, if no power sources are plugged into the other bus interfaces, the system switches over to using the rechargeable battery to provide power for the portable computing device.

In some embodiments, determining whether the first power source is a host or a power adapter involves measuring voltage signals on data lines from the first interface to determine whether the first power source is generating data signals. If the voltage signals indicate that the first power source is generating data signals, the system determines that the first power source is a host.

In some embodiments, the first bus interface can be a universal serial bus (USB) interface or a FireWire interface.

BRIEF DESCRIPTION OF THE FIGURES

FIG. 5A presents a flow chart illustrating how power is adjusted when a power source is plugged into a bus interface in the portable computing device in accordance with the disclosed embodiments.

FIG. 5B presents a flow chart illustrating how power is adjusted when the voltage supplied by a power source drops below a minimum threshold voltage in accordance with the disclosed embodiments.

FIG. 5C presents a flow chart illustrating how spill-over charge current can be routed through another power manager in accordance with the disclosed embodiments.

FIG. 5D presents a flow chart illustrating how power is adjusted when a power source is unplugged from a bus interface in the portable computing device in accordance with the disclosed embodiments.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Portable Computing Device

Figure 1:
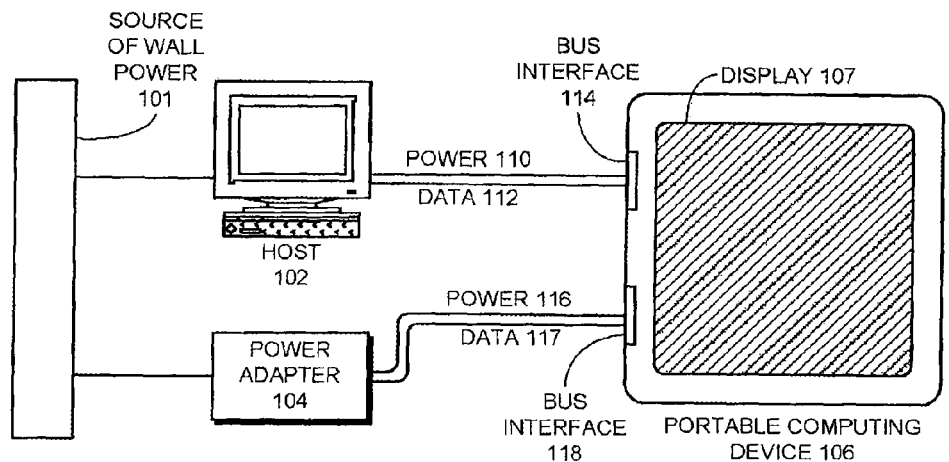
FIG. 1 illustrates a portable computing device, which can receive power through multiple bus interfaces in accordance with the disclosed embodiments.

FIG. 1 illustrates a portable computing device 106 which can receive power through multiple bus interfaces in accordance with the disclosed embodiments. Portable computing device 106 can generally include any type of portable electronic device, such as a laptop computer system, a tablet personal computer (PC), a digital media player or a smart phone. As illustrated in FIG. 1, portable computing device 106 includes a display 107 which is used to output graphical images and text for a user to view. Portable computing device 106 additionally includes a processor, a memory and a battery, which are not illustrated in FIG. 1.

Portable computing device 106 provides multiple bus interfaces, including bus interface 114 and bus interface 118. Bus interfaces 114 and 118 can be universal serial bus (USB) interfaces, which can be used to connect portable computing device 106 to various external storage devices, I/O devices, networks, power adapters and computer systems.

FIG. 1 illustrates how bus interface 114 can be used to couple portable computing device 106 to a host 102. Host 102 can generally include any type of computing device or computer system that contains a processor and memory and can communicate with portable computing device 106. Note that host 102 provides power 110 to, and also communicates data 112 with, portable computing device 106 through bus interface 114.

FIG. 1 also illustrates how a power adapter 104 ("power brick") can be used to provide power 116 to portable computing device 106 through bus interface 118. Note that power adapter 104 also includes data lines 117 to bus interface 118. (These data lines 117 are used to identify what type of power source is used.) Also note that both host 102 and power adapter 104 receive power from a source of wall power 101.

Power-Management Circuitry

Figure 2:
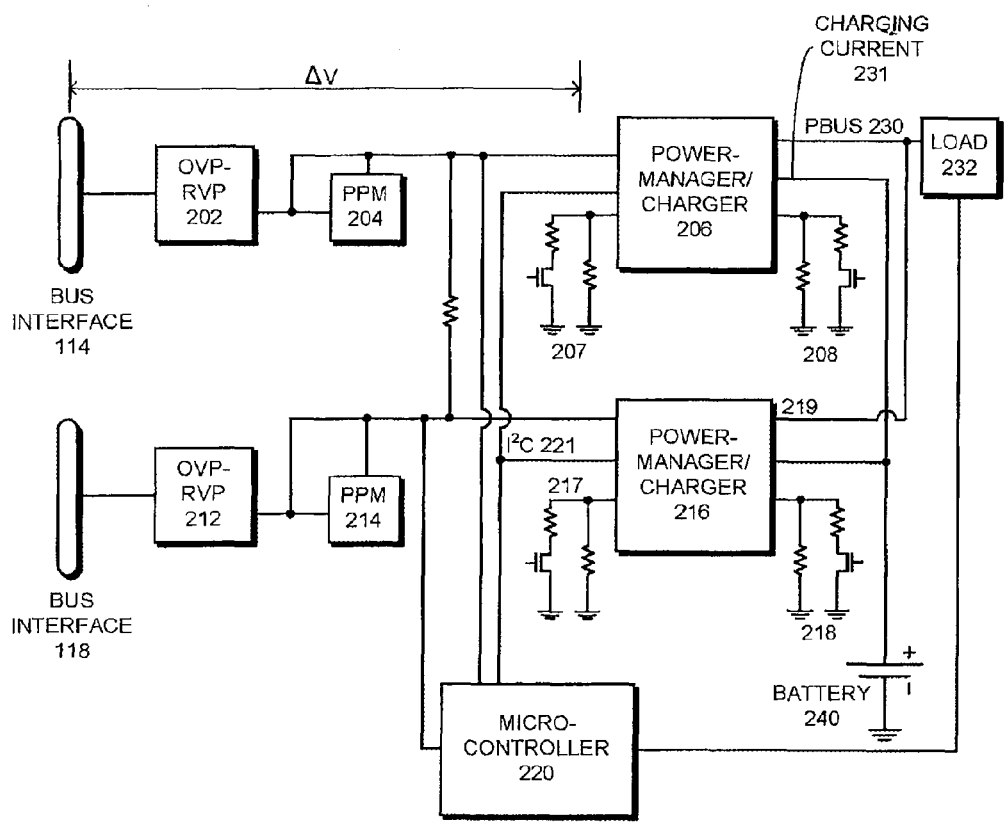
FIG. 2 illustrates power-management circuitry within the portable computing device in accordance with the disclosed embodiments.

FIG. 2 illustrates details of power-management circuitry within portable computing device 106 in accordance with the disclosed embodiments. On the left-hand side of FIG. 1, power lines from bus interface 114 feed into over-voltage protection and reverse-voltage protection (OVP-RVP) circuitry 202 and also through a power-path management (PPM) chip 204. (Note that PPM chip 204 can be implemented using Linear Technology part number LTC4412.) OVP-RVP circuitry 202 and PPM chip 204 operate collectively to protect the power-management circuitry from over-voltage conditions and reverse-voltage conditions.

The output of OVP-RVP circuitry 202 and PPM chip 204 feeds into power-manager/charger chip 206. Power-manager/charger chip 206 is configured to provide a specific input current for a power bus (PBUS) 230, which is used to drive a load 232. Power-manager/charger chip 206 also provides a specific charging current 231, which is used to charge a battery 240. (Note that power-manager/charger chip 206 can be implemented using Linear Technology part number LTC4099.)

Power-manager/charger chip 206 can be configured to provide specific input currents and specific charging currents by selectively tying certain inputs of power-manager/charger chip 206 to ground through selectable resistance values. (This is illustrated in FIG. 2 by the selectable resistors 207 and 208, which are coupled to power-manager/charger chip 206.) In one embodiment, microcontroller 220 can configure these resistance values by selectively activating the illustrated transistors (FETs) in resistor networks 207 and 208. Note that these FETs can be mapped to specific General-Purpose Input-Output (GPIO) locations to enable microcontroller 220 to selectively active them. Also note that if power-manager/charger chip 206 heats up past a threshold temperature, an over-temperature condition arises, which causes power-manager/charger chip 206 to limit the input current and/or charging current.

Note that bus interface 118 is coupled to its own power-management circuitry which is similar to the power-management circuitry coupled to bus interface 114, including OVP-RVP circuitry 212, PPM chip 214 and power-manager/charger chip 216. Power-manager/charger chip 216 can likewise be configured to provide a specific input current for power bus (PBUS) 230, and to provide a specific charging current 231 for battery 240. Note that input current from power-manager/charger chip 206 is combined with input current for power-manager/charger chip 216 to drive PBUS 230. Similarly, the charging current from power-manager/charger chip 206 is combined with charging current from power-manager/charger chip 216 to charge battery 240.

The load 232 which is driven by PBUS 230 includes microcontroller 220, which performs general computational operations for portable computing device 106. Microcontroller 220 can also control power-manager/charger chips 206 and 216 through commands communicated through I²C bus 221. As mentioned above, microcontroller 220 can also control selectable resistors 207, 208, 217 and 218 through FETs which are mapped to specific GPIO locations.

Microcontroller 220 receives power directly from PBUS 230, and also receives power from the outputs of PPM chips 204 and 214 directly to facilitate a system power-up operation. This system power-up operation is described in more detail below with reference to the flow chart illustrated in FIG. 4.

Circuitry for Switching Data Lines

Figure 3:
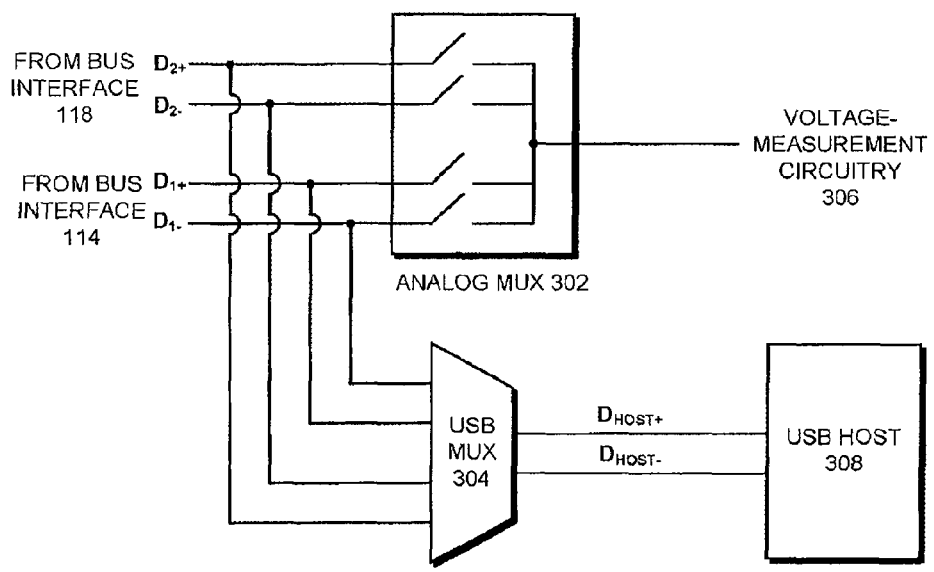
FIG. 3 illustrates circuitry which is used to switch between data lines from the bus interfaces in accordance with the disclosed embodiments.

FIG. 3 illustrates circuitry which is used to switch data lines (as opposed to power lines) from bus interfaces 114 and 118 in accordance with the disclosed embodiments. More specifically, FIG. 3 illustrates how a pair of data signals $D_{2+}$ and $D_{2-}$ from bus interface 118 can be switched with a pair of data signals $D_{1+}$ and $D_{1-}$ from bus interface 114. (Note that there actually exist many pairs of data signals in each bus interface. Hence, FIG. 3 only illustrates how an exemplary pair of data signals from each bus interface can be switched.)

An analog multiplexer (MUX) 302 is used to select either data signals $D_{1+}$ and $D_{1-}$ or data signals $D_{2+}$ and $D_{2-}$ to feed into voltage-measurement circuitry 306 which determines whether the selected data signals are active. If the selected data signals are active, microcontroller 220 (in FIG. 2) infers that the associated bus interface is coupled to a host computer system and not to a power adapter.

A USB MUX 304 (which can be a digital MUX) is used to couple either data signals $D_{1+}$ and $D_{1-}$ or data signals $D_{2+}$ and $D_{2-}$ to a local USB host 308, which resides within portable computing device 106. This enables the local USB host 308 to communicate with a remote USB host which is coupled to the associated bus interface.

In some embodiments, microcontroller 220 switches analog MUX 302 and USB MUX 304 by writing commands to specific GPIO locations.

Power-Up Sequence

Figure 4:
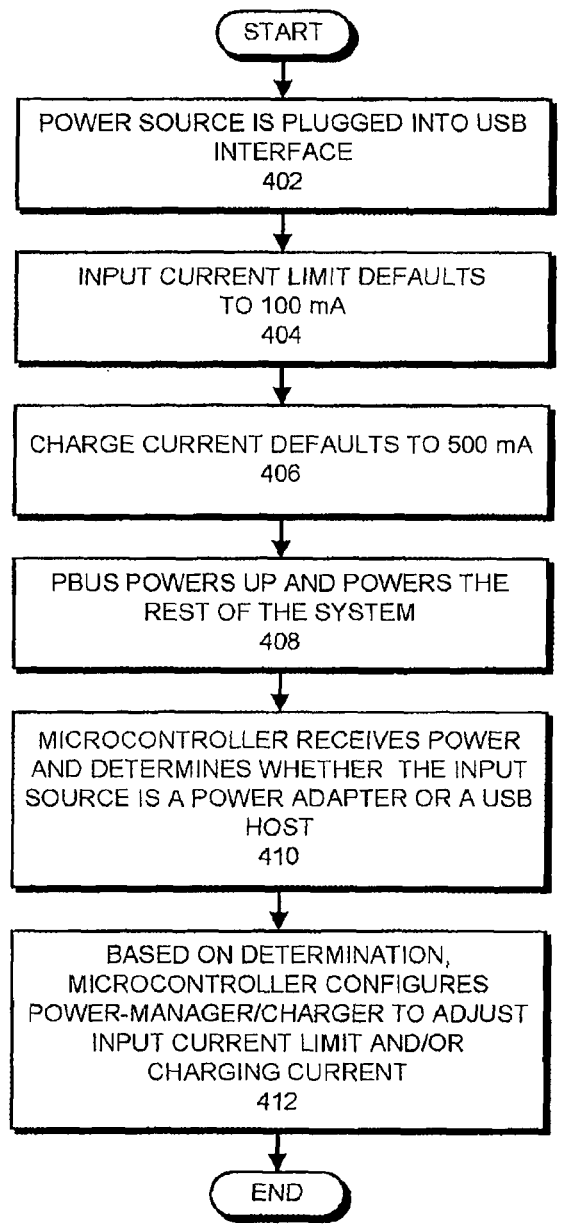
FIG. 4 presents a flow chart illustrating a power-up sequence for a portable computing device in accordance with the disclosed embodiments.

FIG. 4 presents a flow chart illustrating a power-up sequence for a portable computing device in accordance with the disclosed embodiments. At the start of this sequence, portable computing device 106 is turned off in a powered down state. Next, a power source is plugged into one of the USB interfaces, say for example, bus interface 114 (step 402). This power source starts powering up the system and causes the associated power-manager/charger chip 206 to default to a 100 mA input current limit to drive load 232 (step 404), and a 500 mA charging current limit to charge battery 240 (step 406).

Next, PBUS 230 powers up the rest of the system (step 408). Once microcontroller 220 receives power, microcontroller 220 performs various operations to determine whether the input power source is a power adapter or a USB host (step 410). Then, based on the determination, microcontroller 220 configures power-manager/charger chip 206 to adjust the input current limit and the charging current limit to match the capabilities of the specific power source (step 412). For example, if the power source is determined to be a power adapter which can supply 2.1 A of current, the input current limit can be set to 2100 mA and the charging current can be set to a maximum possible value of 1.5 A. In addition, >100 mA of extra spill-over charging current can be routed to battery 240 through the other power-manger/charger chip 216 as is described in more detail below.

Power Adjustments

After the power-up sequence is complete, the system power can be dynamically adjusted based on a number of different conditions. For example, FIG. 5A presents a flow chart illustrating how power can be adjusted when a power source is plugged into a bus interface. In this example, microcontroller 220 receives an interrupt from a power-manager/charger chip 216 indicating that a power source has been plugged into the associated bus interface (step 502). In response to this interrupt, microcontroller 220 determines whether the power source is a host or a power adapter (step 504). Then, based on the determination, microcontroller 220 configures power-manager/charger chip 206 to adjust the input current limit and the charging current limit to match the capabilities of the specific power source (step 506).

In another example, FIG. 5B presents a flow chart illustrating how power is adjusted when the voltage supplied by a power source drops below a minimum threshold voltage in accordance with the disclosed embodiments. In this example, microcontroller 220 receives an interrupt from a power-manager/charger chip 206 indicating that a power source has been unplugged from the associated bus interface 114 (step 512). In response to this interrupt, microcontroller 220 configures power-manager/charger chip 206 to turn off the input current and the charging current received through bus interface 114 (step 514).

In yet another example, FIG. 5C presents a flow chart illustrating how spill-over charge current can be routed through another power-manager/charger chip 206 in accordance with the disclosed embodiments. In this example, if power-manager/charger chip 206 is providing a maximum possible charging current that the power-manager/charger chip 206 is capable of providing, and if after providing any required input current, power-manager/charger chip 206 is capable of providing additional current, the additional current is routed to the other power-manager/charger chip 216, so that the other power-manager/charger chip 216 can provide the additional current as charging current for the battery (step 522).

For example, consider the case where the power source is determined to be a power adapter which can supply 2.1 A of current. Also assume that there is almost no load on the system so the input current limit can be set to 100 mA. In this case, the charging current can be set to a maximum possible value of 1.5 A. In addition, spill-over charging current can be routed through PBUS 230 into a power output 219 of power-manager/charger chip 216. (In this case, the power output 219 functions as a power input.) This enables power-manager/charger chip 216 to use the spill-over charging current to charge battery 240.

In a final example, FIG. 5D presents a flow chart illustrating how power is adjusted when a power source is unplugged from a bus interface in accordance with the disclosed embodiments. In this example, microcontroller 220 receives an interrupt indicating that a power source was unplugged from bus interface 114 (step 532). Next, if no power sources are plugged into the other bus interface (namely, bus interface 118), microcontroller 220 configures power-manager/charger chip 216 switch over to using battery 240 as a power source for portable computing device 106 (step 534).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for controlling power received through multiple bus interfaces in a portable computing device, comprising:
   sensing when power sources are plugged into first and second bus interfaces in the portable computing device, wherein the first bus interface is coupled to a first power manager, and the second bus interface is coupled to a second power manager;
   upon sensing that a first power source is plugged into the first bus interface in the portable computing device, determining whether the first power source is a host or a power adapter, and
   based upon whether the first power source is a host or a power adapter, using the first power manager coupled to the first bus interface to limit a first input current from the first power source to power the computing device, and to selectively provide a first charging current to a rechargeable battery for the portable computing device; and
   upon sensing that the first power source becomes unplugged from the first bus interface, determining whether a power source is plugged into the second bus interface,
   if no power source is plugged into the second bus interface, configuring the second power manager coupled to the second bus interface to perform switching over to using the rechargeable battery to provide power for the portable computing device.

2. The method of claim 1, further comprising:
   upon sensing that a second power source is plugged into the second bus interface in the portable computing device,
   determining whether the second power source is a host or a power adapter, and
   based upon whether the second power source is a host or a power adapter, using the second power manager coupled to the second bus interface to limit a second input current received from the second power source to power the computing device, and to selectively provide a second charging current to the rechargeable battery.

3. The method of claim 1, wherein the method further comprises:
   determining whether a voltage supplied by the first power source falls below a minimum threshold voltage; and
   if so, reducing the first input current received from the first power source.

4. The method of claim 1, wherein if the portable computing device is powered off when the first power source is plugged into the first bus interface, the first power manager supplies an initialization current to power up the portable computing device before the portable computing device can determine whether the first power source is a host or a power adapter.

5. The method of claim 1, wherein if the first power manager is providing a maximum charging current that the first power manager is capable of providing to the rechargeable battery, and if the first power source is capable of providing additional current, the method further comprises routing the additional current to the second power manager associated with the second bus interface, so that the second power manager can provide the additional current as charging current for the rechargeable battery.

6. The method of claim 1, wherein sensing when a power source is plugged into a bus interface involves receiving an interrupt from a dedicated power manager for the bus interface indicating that the power source is plugged into the bus interface.

7. The method of claim 1, wherein if the first power source is a host, the method further comprises using the first bus interface to facilitate communications between the first power source and the portable computing device, wherein the communications can take place while the first power source is supplying power to the portable computing device.

8. The method of claim 1, wherein determining whether the first power source is a host or a power adapter involves:
   measuring voltage signals on data lines from the first interface to determine whether the first power source is generating data signals; and
   if the first power source is generating data signals, determining that the first power source is a host.

9. The method of claim 1, wherein the first bus interface includes:
   a universal serial bus (USB) interface; or
   a FireWire interface.

10. A portable computing device which can receive power through multiple bus interfaces, comprising:
    a controller;
    a memory; and
    multiple bus interfaces including first and second bus interfaces, wherein the first bus interface is coupled to a first power manager, and the second bus interface is coupled to a second power manager;
    wherein upon detecting that a first power source is plugged into a first bus interface, the controller is configured to,
    determine whether the first power source is a host or a power adapter, and
    based upon whether the first power source is a host or a power adapter, configure the first power manager coupled to the first bus interface to limit a first input current from the first power source to power the computing device, and to selectively provide a first charging current to a rechargeable battery for the portable computing device; and
    wherein upon sensing that the first power source becomes unplugged from the first bus interface, if no power source is plugged into the second bus interfaces, the second power manager coupled to the second bus interface is configured to switch over to using the rechargeable battery to provide power for the portable computing device.

11. The portable computing device of claim 10, wherein upon detecting that a second power source is plugged into the second bus interface in the portable computing device, the controller is configured to,
    determine whether the second power source is a host or a power adapter, and
    based upon whether the second power source is a host or a power adapter, configure a second power manager coupled to the second bus interface to limit a second input current received from the second power source to power the computing device, and to selectively provide a second charging current to the rechargeable battery.

12. The portable computing device of claim 10, wherein the controller is further configured to:
    determine whether a voltage supplied by the first power source falls below a minimum threshold voltage; and
    if so, reduce the first input current received from the first power source.

13. The portable computing device of claim 10, wherein if the portable computing device is powered off when the first power source is plugged into the first bus interface, the first power manager is configured to supply an initialization current to power up the portable computing device before the portable computing device can determine whether the first power source is a host or a power adapter.

14. The portable computing device of claim 10, wherein if the first power manager is providing a maximum charging current that the first power manager is capable of providing to the rechargeable battery, and if the first power source is capable of providing additional current, the first power manager is configured to route the additional current to the second power manager associated with the second bus interface, so that the second power manager can provide the additional current as charging current for the rechargeable battery.

15. The portable computing device of claim 10, wherein the controller determines that a power source is plugged into a bus upon receiving an interrupt from a dedicated power manager for the bus interface, wherein the interrupt indicates that the power source is plugged into the bus interface.

16. The portable computing device of claim 10, wherein if the first power source is a host, the first bus interface is configured to facilitate communications between the first power source and the portable computing device, while the first power source is supplying power to the portable computing device.

17. The portable computing device of claim 10, wherein determining whether the first power source is a host or a power adapter involves:
    measuring voltage signals on data lines from the first interface to determine whether the first power source is generating data signals; and
    if the first power source is generating data signals, determining that the first power source is a host.

18. The portable computing device of claim 10, wherein the first bus interface includes:
    a universal serial bus (USB) interface; or
    a FireWire interface.

19. A computer-readable non-transitory storage medium storing instructions that when executed by a controller in portable computing device cause the controller to perform a method for controlling power received through multiple bus interfaces including first and second bus interfaces in the portable computing device, the method comprising:
    upon detecting that a first power source is plugged into the first bus interface in the portable computing device,
    determining whether the first power source is a host or a power adapter, and
    based upon whether the first power source is a host or a power adapter, configuring a first power manager coupled to the first bus interface to limit a first input current from the first power source to power the computing device, and to selectively provide a first charging current to a rechargeable battery for the portable computing device; and
    upon sensing that the first power source becomes unplugged from the first bus interface, determining whether a power source is plugged into the second bus interface,
    if no power source is plugged into the second bus interface, configuring a second power manager coupled to the second bus interface to perform switching over to using the rechargeable battery to provide power for the portable computing device.

20. The computer-readable non-transitory storage medium of claim 19, wherein the method further comprises:
    upon detecting that a second power source is plugged into the second bus interface in the portable computing device,
    determining whether the second power source is a host or a power adapter, and
    based upon whether the second power source is a host or a power adapter, using the second power manager coupled to the second bus interface to limit a second input current received from the second power source to power the computing device, and to selectively provide a second charging current to the rechargeable battery.

21. The computer-readable non-transitory storage medium of claim 19, wherein the method further comprises:
    determining whether a voltage supplied by the first power source falls below a minimum threshold voltage; and
    if so, reducing the first input current received from the first power source.

* * * * *